May 21, 1974     E. NITSCH     3,812,010
METHOD OF PRODUCING FRUCTOSE AND GLUCOSE FROM SUCROSE
Filed Aug. 4, 1971
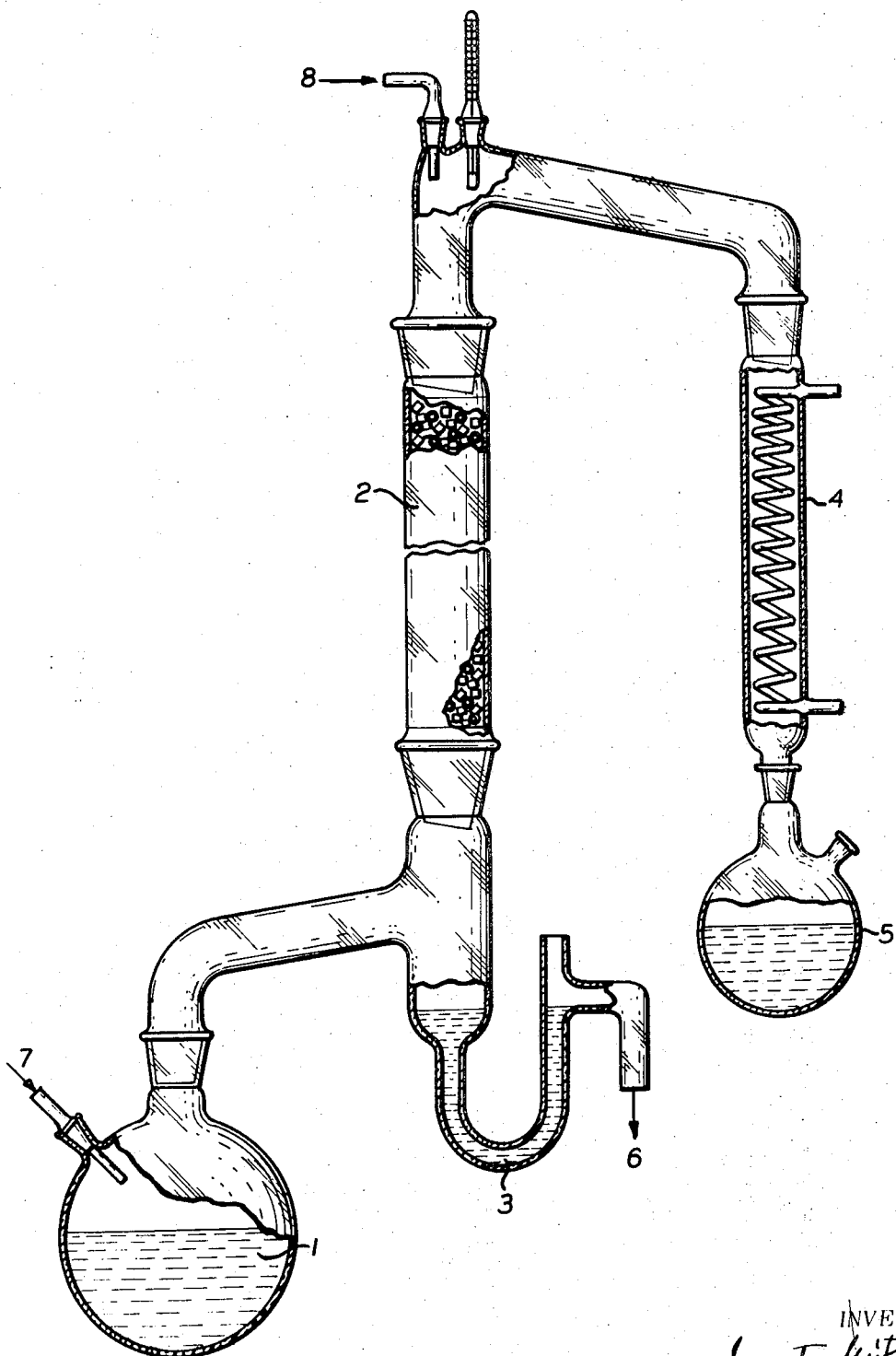
INVENTOR.
BY
ATTORNEY 3,812,010
METHOD OF PRODUCING FRUCTOSE AND GLUCOSE FROM SUCROSE
Ernst Nitsch, Linz, Austria, assignor to Laevosan-Gesellschaft Chem.-Pharm. Industrie Franck & Dr. Freudl, Linz, Austria
Continuation-in-part of abandoned application Ser. No. 713,366, Mar. 15, 1968. This application Aug. 4, 1971, Ser. No. 168,973
Int. Cl. C13k 1/00, 3/00, 9/00
U.S. Cl. 195—31 F                    13 Claims

ABSTRACT OF THE DISCLOSURE

Method for producing fructose and glucose from a mixture thereof in a mineral acid-free aqueous solution. Water is evaporated from said solution at a temperature between 50° C. and 120° C. A low boiling point alcohol is added to said solution, and glucose and fructose then precipitated. The water content of said solution is not greater than 1% when fructose is precipitated therefrom. The invention also includes a method of preparing said mixture in said solution from sucrose by conversion thereof to invert sugar.

---

This is a continuation-in-part application of the co-pending patent application, Ser. No. 713,366 filed Mar. 15, 1968 and now abandoned.

The present invention relates to a method of producing fructose and glucose from mixtures of fructose and glucose in various proportions and also from sucrose. It is known that invert sugar, a mixture of fructose and glucose, may be obtained from sucrose by either an acid induced hydrolysis, or by an enzymatic process. Attempts have been made to utilize invert sugar as the source of fructose and glucose on a technically feasible commercial scale. The known methods are, however, unduly complex, resulting in the production of products bearing high production costs. This is a decisive disadvantage, particularly in the case of glucose which can be obtained very economically from other source materials.

It is known that one part of glucose can be obtained from invert sugar by crystallization from an aqueous or an alcoholic solution (for example see the article by T. S. Harding, Sugar 25, 406 (1923)). Until the present, it has only been possible by an indirect method, utilizing an additional chemical or physical-chemical operation to obtain the remainder of the glucose, and to obtain the fructose in its pure state, at all. One process is based on the addition of calcium hydroxide to the invert sugar solution to precipitate the calcium salts of fructose. This difficultly soluble salt of fructose is separated and thereafter again decomposed by addition of an acid, usually carbonic acid, followed by concentration of the fructose solution. The fructose is then crystallized from an ethanol solution.

Other processes are based upon oxidation of the glucose by reaction with bromine or iodine, to gluconic acid, followed by a separation thereof from the fructose which is not oxidized under specified conditions by the oxidation procedure utilized. The gluconic acid is separated as a difficultly soluble sodium or calcium salt, or is removed by contact with an anionic exchange material. The fructose is then obtained from the solution which remains. The process utilizing the electrolytic variation of this principle (Sugar Research Foundation) Pat. No. 2,567,060 is of only technical interest because of the high price of the halogens and the high concentration of salt.

It has also been attempted to transform the glucose product from the invert sugar selectively by microbiological means, or to decompose it, leaving the fructose product (M. Tsukamoto, S. Matsumoto, J. Fermentation Technol. 25, 142 (1947), Dawes Laboratories Inc., U.S. Pat. No. 3,050,444). Alternatively, it has been attempted to microbiologically transform the fructose product prepared from invert sugar into a high molecular weight and readily separable polysaccharide by precipitation from an alcoholic solution. The high molecular weight polysaccharide thereafter is hydrolyzed to fructose and can be readily crystallized by conventional methods. (Patent of the German Democratic Republic No. 24,763.)

A more novel process separates glucose and fructose by column chromatography of an aqueous invert sugar solution by treatments with alkaline earth salts of cationic exchange materials, resulting in the retention of the fructose relative to the glucose. Thus it has been possible to obtain the desired fructose and glucose individually in successive dilute fractions (see The Dow Chemical Company's U.S. Pats. Nos. 3,044,904; 3,044,905 and 3,044,906).

In addition to separating glucose and fructose from invert sugar, the process of the present invention provides for the separation of glucose and fructose from mixtures thereof obtained from sources other than invert sugar and containing varied proportions of fructose and glucose. This is of great technical importance, as it is possible to transform glucose into fructose up to a specified equilibrium amount. This equilibrium amount can be obtained either by treatment with alkali catalysis [Lobry de Bruyn et W. Alberda van Ekenstein, Rec. trav. chim. 14 (1895) 203; J. B. Gottfried and D. G. Benjamin, Ind. Eng. Chem. 44, 141 (1952)] or by treatment with enzymes [Nobuzo Tsumura and Tomotaro Sato (Agric. biol. Chem./Tokyo/ 29, 1123–28, 1965, ibid. 29, 1129–34, 1965, U.S. Pat. 2,950,228 of Aug. 23, 1960)]. In the first case depending upon the method and reaction conditions, ratios of 10–70% can be obtained; in the second case, until now, no more than about 50%.

It is an object of the present invention to separate glucose and fructose from various mixtures thereof.

SUMMARY OF THE INVENTION

The present invention provides a process to alternatively crystallize glucose and fructose from mixtures thereof, e.g., from invert sugar solutions, without utilizing any other separatory procedures. As a result it is theoretically possible to separate the mixture, e.g. the invert sugar, completely into the two individual sugars. To accomplish the foregoing, the following are required:

1. When starting with sucrose, the inversion procedure must be carefully carried out to prevent the production of byproducts which retard crystallization. In particular, inversion temperatures of between 50° C. and 120° C., and preferably about 80° C., and the use of 0.05 N HCl, are used.

2. The sugar solutions must be carefully treated during the evaporation processes. Minimum residence times in the high temperature zones and the lowest possible vaporization temperatures should be used, preferably using ring layer evaporators. Preferably the evaporation is carried out from thin liquid films of solution at a temperature of less than 120° C.

3. A low boiling alcohol should be selected as the solvent, preferably methanol.

4. Fructose, and alternatively both sugars, should be crystallized from solutions having a water content below about 1%.

5. Since the solution is supersaturated with both sugars during crystallization of either of the sugars, crystal nuclei of the other are to be excluded to the extent possible. The supersaturation of the sugar which is not being crystallized must be maintained in the metastable range to prevent spontaneous formation of crystal nuclei.

In the embodiment of the present invention which provides a method for producing fructose and glucose from sucrose, the sucrose is first inverted under carefully controlled conditions to form a pure, and preferably a mineral acid-free, invert sugar solution.

In all cases, when the mixture of glucose and fructose solution is concentrated by evaporation, it should be carried out under carefully controlled conditions, and the glucose crystallized. The glucose is crystallized using a low boiling alcohol, for example, methanol. The two sugars are alternatively crystallized from the alcoholic solutions after removal of the remainder of water (the residual water content being not more than about 1%). The crystals are completely separated by this process.

The low boiling point alcohols are preferably those alcohols and ether-alcohols containing 1–4 carbon atoms and having a boiling point between 64° and 135° C., e.g. methylene glycol, methanol, ethylene glycol mono-methyl ether.

In the drawings, the figure discloses the apparatus used in Example 1.

DETAILED DESCRIPTION OF THE INVENTION

The details of the process follow:

1. (A) Inversion: This step is used when the initial material is sucrose. The sucrose may be inverted using one of the known processes. These are the enzyme process, the acid hydrolysis process, or hydrolyses of the sucrose on strongly acid exchange resins. The conditions must be carefully controlled. Thus, the temperature is maintained below 80° C. The acid concentration is maintained below 0.05 N. The inversion process should be carried out in the minimum time possible to minimize the formation of materials which retard crystallization. The residual sucrose content should be less than 0.1%. Any mineral acids present in the invert solution must be completely removed, preferably by ion exchange methods.

1. (B) Isomerization: Solutions containing glucose may be isomerized by treatment with an alkali catalyst or with an enzyme, as noted hereinbefore, to provide an aqueous solution containing glucose and enriched in fructose.

2. The glucose crystallization: The glucose and fructose solution, e.g. the invert sugar solution, which is completely salt and acid-free is carefully concentrated in vacuum. The glucose can be obtained without water by directly reducing the aqueous solution to about 80% as hydrate, or preferably by reducing to about 90%, and adding thereto an equal part by weight of methanol. In each instance, about 50% of the glucose present crystallizes within three days. The remaining mother liquor, contains on a dry basis, about 67% fructose and 33% glucose.

3. Fructose crystallization: The mother liquor product of paragraph 2 hereinbefore is concentrated in a vacuum to 95% when the crystallization is from an aqueous system, and equal parts by weight of methanol is added. When the crystallization is from a methanol solution, the solution is concentrated only about 50%. To obtain a successful fructose crystallization, it is important to have the lowest possible residual water content. Since water may be evaporated from aqueous sugar solutions containing above 95% of sugar only with difficulty, it has been found advantageous to effect the dehydration of methanol solutions containing 3 or more percent of water, to a water content below 1%. Although fructose will crystallize from solutions with higher water content, the rate falls appreciably. The principle of this column dehydration follows:

The solution to be dehydrated is fed into the head of the column. Dry methanol vapor flows from the foot of the column which is brought to an equilibrium state with the water from the solution. The water-containing methanol vapor emerging from the head of the column can be fed directly, or alternatively, after condensation in another column in which the feed water is separated again and in which column water-free methanol vapor can be taken (at the head thereof) for use as a feed at the bottom of the first column. In the sump of the first column the dry methanol sugar-containing solution is collected and can be removed in a continuous manner. By heating the sump of the column, water removal takes place simultaneously while the solution is being concentrated.

It is, of course, also possible to mix the glucose and fructose containing solution, e.g. the invert sugar solution, without prior glucose crystallization, with a solvent, e.g., methanol, to perform the first separation of glucose from the methanol glucose and fructose containing solution prior to or after water removal therefrom. Water removal from the glucose and fructose containing solution is not necessary for the separation of the glucose nor does it adversely affect said process. However, water removal is necessary for the separation of the fructose.

It has now been found that to crystallize the individual fractions, relatively long periods of time are required. This is particularly true the greater the amounts of glucose and/or fructose which have already been separated from that mother liquor. About six days are required to obtain 50% of the invert sugar as crystals in the fractions (see Example 1). If, however, a mixture of equal parts of pure fructose and pure glucose are provided as a model solution, the same yields are obtained by fractional crystallization in about three to four days, i.e., in about half of the time.

It has now been discovered that the slower crystallization of invert sugar when compared with the crystallization of the model solution containing equal parts of glucose and fructose is explained by the fact that different appendant materials become enriched in the mother liquor. These materials are created during the hydrolysis and the inversion of the sucrose. These materials, it has been discovered, are disaccharides. The presence of these materials which become enriched in the mother liquor finally prevent further crystallization from the mother liquor. Accordingly, a quantitative yield from the process becomes impossible.

It has now been found that the method of the present invention can be operated to produce practically quantitative yields if partially spent mother liquor, i.e. mother liquor from which fructose and glucose have been crystallized and from which the crystallization rate has appreciably decreased, are again hydrolyzed. This results in the reduction of the undesired attendant materials into, for the greatest part, monosaccharides, i.e. glucose and fructose. This is followed by a repetition of the crystallization process until a substantially quantitative yield is obtained.

The additional hydrolysis of the mother liquor, according to the present invention, can be performed in either of two different methods. The mother liquor can be subjected to a new hydrolysis. Alternatively, if during the crystallization of glucose and fructose from the mother liquor, the crystallization rate has fallen below a technically feasible rate, the impoverished mother liquor may be combined with and work simultaneously with a fresh mother liquor, to produce glucose and fructose by sequential crystallization. In an alternative method, a crystal mixture of pure fructose and glucose can be separated from the glucose and fructose containing solution, e.g. the invert sugar solution. This crystal mixture can then be separated, substantially quantitatively, by sequential crystallization. The mother liquor from which the mixture of crystals was separated, is then subjected to another hydrolysis under suitable conditions, followed by separation of mixtures of the fructose and glucose crystals, and the process repeated when the crystallization rate has fallen below a technically feasible value. Accordingly, the sugar rich solution can be processed to obtain a mixture of crystals, or alternatively, processed for sequentially obtaining glucose and fructose crystals. It is also possible, of course, to combine both processes and to first separate from the enriched liquor a glucose fraction, followed by processing of the mother liquor to obtain a crystal mixture of glucose and fructose which is removed and then separated into the individual components. The impoverished mother liquor can then be reprocessed by further hydrolysis.

Isomerization of glucose may be applied to glucose sources other than crystal glucose (or solution thereof), e.g., starch hydrolysis products, if the glucose source does not contain other sugars and oligosaccharides in amounts greater than about 1% by weight on a dry basis. The presence of such substances in larger amounts would strongly retard the crystallization process. Since the glucose remaining after a given starting amount has been subjected to isomerization, may subsequently be subjected to additional isomerization(s), it is possible to eventually transform a given amount of glucose completely into crystallized fructose, with the exception of unavoidable losses of material. This also applies to sucrose and invert sugar source materials.

The following examples illustrate the present invention without limiting the invention to the examples:

EXAMPLE 1

Production of glucose and fructose from invert sugar which has been produced by an acid hydrolysis (a) Inversion: 5 kg. of a 50 weight/weight percent sucrose solution (=4.05 liters) are heated to 50° C. 213 ml. 1 N HCl is added to produce a mixture which is 0.05 N. This mixture is maintained for three hours in a thermostatic bath at 50° C. After this time peroid, the hydrolysis is complete. It is cooled rapidly and stirred with 150 ml. anion-exchanger Duolite A 7 in the OH-form until a neutral reaction is obtained. After filtration, a clear, colorless invert sugar solution with a specified rotation $[\alpha]_D^{20}=-19.9°$ is obtained, which substantially corresponds with complete inversion. Sucrose cannot be determined in the solution.

(b) Glucose-crystallization I: 2.06 kg. of the invert sugar solution obtained in accordance with (a) with 48.5% total sugar, corresponling to 1 kg. of water-free invert sugar, are concentrated on a hot water bath, in vacuum, to about 95%. The water bath is maintained at about 90° C. An equal part by weight of boiling methanol is added, with strong stirring. The solution, which contains in accordance with the Karl Fischer method, 4.7% water, is cooled to about 10° C. 26 g. of water-free glucose and about the same quantity of methanol are added. It is maintained for three days with continuous regular stirring at 10° C., thereafter the pure white crystals are centrifugally separated from the mother liquor and washed several times after with methanol. The crystals are dried at 60° C. Yield: 276 g., $[\alpha]_D^{20}=+49.3°$, fructose content about 2%.

(c) Fructose crystallization I: The mother liquor from the glucose crystallization in accordance with (b), which contains about 8% water is combined with the methanol wash liquors and fed at a rate of 2 ml./min. over a storage vessel 8 to the head of the dehydration column. In the evaporator column 1, waterfree methanol is evaporated at about 20 ml./min. The vapor is fed by means of a connecting conduit to the foot 1 of the column 2. Column 2 is a glass tube with Raschig-rings of glass, having a diameter of 4 mm., and an open width of 50 mm., and an open width of 50 mm., with a filling length of 500 mm. At the bottom, the column is closed by the syphon 3 in which the dewatered methanol sugar solution is collected and flows off continuously into the collecting container 6. The water-containing methanol vapor leaving the head of the column is condensed in the cooler 4 and caught in the receiver 5. The distillate can be fed again to the evaporator column 1 after rectification, by means of a storage condenser.

By condensation in the column a certain concentration takes place, so that about 3 liters of dewatered products with a total sugar content of 25% are obtained. The product is reduced by distillation from a water bath maintained at 90° C., to 50%, and then cooled to 10° C. 25 g. of pure fructose is injected with about the same quantity of methanol. The residual water content in the crystallization solution is up to about 0.9%. The solution is maintained for three days with continuous slight stirring at 10° C., thereafter the pure white crystals are centrifugally separated from the mother liquor and washed several times with methanol. The crystals are dried in a dry box at 60° C. Output 261 g., $[\alpha]_D^{20}=-90.7°$, glucose content about 1.1%.

(d) Glucose crystallization II: The mother liquor from the fructose crystallization in accordance with (c) is combined with the methanol wash liquors and concentrated by distillation to about 50 g./g. percent. As in (b) after injection with 12.5 g. glucose, crystallization takes place for three days to obtain the crystal product. Yield: 125 g., $[\alpha]_D^{20}+50.3°$, fructose content about 1.2%.

(e) Fructose crystallization II: The mother liquor from the glucose crystallization in accordance with (d) is combined with the methanol wash liquors and concentrated by distillation to about 50 g./g. percent (weight/weight percent). As at (c), 12.5 g. fructose are injected. Crystallization proceeds for three days and the crystals recovered. Yield: 114 g., $[\alpha]_D^{20}=-91.0°$, glucose content about 0.9%.

(f) In the same manner a third glucose and fructose crystallization each is obtained.

Glucose crystallization III: Output 41 g., $[\alpha]_D^{20}=+49.9°$. Fructose content 1.6%.

Fructose crystallization III: Output 57 g., $$[\alpha]_D^{20}=-90.2°.$$

Glucose content 1.2%.

The remaining mother liquor is clearly of a yellow color and can be brought only very slowly to a crystallization, and is not worked further.

Total yield glucose: 452 g.=90.4% of the invert sugar, after deduction of the crystals which were added to induce crystallization.

Total yield fructose: 432 g.=86.4% of the sugar after deduction of the crystals injected to induce crystallization.

By a single recrystallization in the case of fructose from methanol, and in the case of glucose from water or methanol, both sugars can be obtained completely pure.

EXAMPLE 2

Production of fructose and glucose from invert sugar produced by hydrolysis on strongly acid cationic exchange material (a) Inversion: In a glass tube of a width of 55 mm. and a length of 500 mm. equipped with a heating jacket, about 700 ml. of a cationic exchanger resin, Duolite C 25, are inserted in the H+-form. The column is heated to 45° C. and a 50 g./g. percent (weight/weight percent) saccharose solution at a rate of 6 ml./min. is preheated to the same temperature at its bottom.

After about 350 ml. of the first product is obtained, an invert sugar solution with a specific rotation of $$[\alpha]_D^{20}=-19.5°$$

appears at the head of the column. This solution corresponds to complete hydrolysis. About 100 liters of a saccharose solution can be totally inverted wtihin the time period of two weeks without any observable loss of effectiveness.

(b) Glucose crystallization I: 1.9 kg. of the invert sugar solution with 52.5% total sugar corresponding to 1 kg. of water-free invert sugar are concentrated as in Example 1 to 95%, dissolved in methanol and crystallized after injection with 25 g. of water-free glucose. Yield: 233 g., $$[\alpha]_D^{20}=+50.8°,$$

fructose content about 1.0%.

(c) Fructose crystallization I: Dehydration and crystallization as in Example 1. Yield: 257 g., $[\alpha]_D^{20} = -91.0°$, glucose content about 0.7%.

|   | Output, g. | $[\alpha]_D^{20}$, degrees | Foreign sugar content, percent |
|---|---|---|---|
| (d) Glucose crystallization II | 135.0 | +49.6 | 1.8 |
| (e) Fructose crystallization II | 87.0 | −90.1 | 1.3 |
| (f) Glucose crystallization III | 35.0 | +48.9 | 2.3 |
| (g) Fructose crystallization III | 38.0 | −90.1 | 1.3 |

Total output glucose: 403.0° g.=80.1% of the feed sugar, after deduction of the germ crystals added.

Fructose: 382.0 g.=76.4% of the feed sugar after deduction of the germ crystals added.

The remaining mother liquor is clearly of yellow color and further crystallization is very slow. It is not worked further.

EXAMPLE 3

(a) Production of a mixture of fructose-glucose crystals from invert sugar 1 kg. of crystallized sucrose was dissolved in 500 ml. of hot water and the solution, after addition of 15 ml. 1 N HCl maintained in a boiling water bath for exactly 6 minutes. It is then quickly cooled and neutralized with 15 ml. of sodium bicarbonate solution. About 65% invert sugar solution thus obtained was fed at a rate of 300 ml./h. to the head of the dewatering column, while the methanol vaporizer proluced about 300 ml. methanol vapor per hour. Methanol invert sugar solutions with about 25% total sugar content and a water residue of 0.5% were obtained. The methanol sugar solution was concentrated by distillation from the water bath to 65%, cooled and injected with 20 g. of mixed crystals which were moistened with methanol from previous runs. Usually dry glucose and fructose have only a slight (slow) effect when added as germ crystals. Thereafter, by stirring for 48 hours in a closed vessel at 10° C., it was crystallized. The crystals are recovered by centrifuging and are washed with methanol in a screen centrifuge, and dried in the dry box at 60° C. Yield: 593 g. of mixed crystals of 43.5%=258 g. of fructose; and 56.5%=335 g. of glucose.

Chromatographically no side spots were found which differed from the feed invert sugar solution. The mother liquor was again reduced to 65%, and worked a second time under the same conditions to obtain crystals. An additional 204 g. mixture of crystals were obtained. It consisted of 54.6%=111 g. of fructose; and 45.4%=93 g. of glucose which was also chromatographically pure. The total output was 797 g. of the mixture of crystals, consisting of 46.3%=369 g. of fructose, and 53.7=428 g. of glucose.

(b) Production of a mixture of fructose-glucose crystals from an impoverished mother liquor The impoverished mother liquor from which several crops of mixed crystals were obtained and from which further crystals could only be obtained at an impractically slow rate and which contains about 1.2 kg. total sugar, has been collected, by careful distillation of the methanol. Water was added to obtain a 20% aqueous solution and processed through a column containing 200 ml. cation exchange resin, Duolite C 25, in the H+-form. By this arrangement the sodium chloride present from the neutralization is transformed into hydrochloric acid. The collected sugar solution contained 18.5% total sugar and 7.5 mmol HCl/l. 5400 g. of the solution containing exactly 1 kg. total sugar was heated quickly to boiling, hydrolyzed for 20 minutes in a boiling water bath, thereafter quickly cooled and neutralized with 1 N sodium bicarbonate solution to a pH 4.5 exactly. It was concentrated in vacuum to 65%, and dewatered in a column as in Example 3(a). After concentration of the resultant methanol sugar solution to 65%, it was crystallized as in 3(a) for 48 hours at 10° C.

Yield: 546 g. of mixed crystals consisting of 71%=409 g. of fructose, and 29%=167 g. of glucose.

As described under 3(a), after concentration of the mother liquor, a second mixture of crystals is obtained. Yield: 186 g., consisting of 69%=128 g. of fructose, and 31%=58 g. of glucose. Total output: 762 g., consisting of 537 g. of fructose, and 225 g. of glucose (70.2 and 29.8%, respectively).

The mother liquor from the second crystallization can be hydrolyzed again in the same manner and further treated to yield crystals so that substantially all the invert sugar can be recovered.

(c) Production of crystallized fructose and glucose from the mixed crystals (1) Glucose crystallization I: 1 kg. of dry mixed crystal product from a plurality of crystallizations, according to (a) and (b), containing 48.5% fructose and 51.5% glucose was dissolved in 2 kg. water-free methanol under stirring, and heated on a water bath. The solution was filtered over paper, cooled and after injection with 10 g. water-free glucose stirred for 24 hours at 10° C. After the crystals were obtained from a screen centrifuge, they were washed several times with methanol and dried in the dry box at 60° C. Yield: 241 g. pure white glucose crystals, $[\alpha]_D^{20} = +52.3°$.

(2) Fructose crystallization I: The mother liquor received from the preceding separation, to which methanol had been added was concentrated on a water bath to 40%, cooled and injected with 10 g. of fructose crystals. After stirring for 24 hours at 10° C. 221 g. of pure white fructose crystals were obtained, $[\alpha]_D^{20} = -91.5°$.

(3) Glucose crystallization II: The mother liquor from the fructose crystallization to which methanol had been added was concentrated in a water bath to 35%, cooled, injected with 5 g. of glucose and crystallized within 24 hours at 10° C. Yield: 113 g. of crystallized glucose, $[\alpha]_D^{20} = +52.5°$.

(4) Fructose crystallization II: The mother liquor of (3) to which methanol had been added was concentrated in the watch bath to 40%, injected after cooling with 5 g. of fructose crystals, and crystallized for 24 hours at 10° C. The yield is 114 g. of fructose crystals, $$[\alpha]_D^{20} = -91.3°.$$

In the same manner, the mother liquor can be exploited to obtain substantially the entire sugar content. It is advisable, in practice, to complement, after each glucose-fructose-crystallization cycle, the amount of sugar in the solution, by admixing an addition of enriched mother liquor.

EXAMPLE 4

Production of a mixture of fructose-glucose-crystals from a prior glucose crystallization As in Example 3, the sugar had been inverted, and the glucose crystallization [Example 1(b)] had been performed. Yield: 248 g. glucose (of 1 kg. invert sugar).

The mother liquor was dewatered, and concentrated to 65 weight/weight percent, cooled and injected with 20 g. of mixed crystal, moistened with methanol, as in Example 3. Thereafter by stirring for 48 hours in a closed vessel, it was crystallized at 10° C. The mixed crystals were obtained by centrifuging. They were washed with methanol, centrifuged, and dried in the dry box at 60° C. The output is 459 g. of mixed crystals consisting of 68%=315 g. of fructose, and 32%=144 g. of glucose.

The mother liquor was again concentrated to 65% and a second mixture of crystals obtained by a second crystallization. The yield is 104 g. of mixed crystals consisting of 72%=75 g. of fructose, and 28%=29 g. of glucose.

Total yield:

(1) 248 g. glucose
(2) 563 g. of mixed crystals consisting of 390 g. of fructose, and 173 g. of glucose The mixed crystals can be worked in accordance with Example 2(c), with the omission of the glucose crystallization I completely, to obtain the two individual sugars.

EXAMPLE 5

(a) Production of a mixture of fructose-glucose-crystals using methyl glycol as the solvent 1 kg. crystallized saccharose was dissolved in 500 ml. of hot water, the solution cooled to 80° C., 15 ml. 1 N HCl was added, and the solution maintained 22 minutes at 80° C. Thereafter it was cooled rapidly and neutralized with 15 ml. 1 N sodium bicarbonate solution. The invert sugar solution has been concentrated on a water bath at 90° C., in vacuum to about 95%. The residue was dissolved hot in 1 kg. ethylene glycol monomethyl ether, and concentrated in vacuum to 1.5 kg. The solution which is now water-free, has been injected with 20 g. of mixed crystals obtained from previous experiments which had been moistened with methyl glycol.

Thereafter, crystallization was obtained by stirring for 48 hours in a closed vessel at 10° C. The mixed crystals were obtained by centrifuging and washing with methyl glycol on a centrifuge, and dried in vacuum dry box at 60° C. The output was 555 g. of mixed crystals containing 43%=239 g. of fructose, and 57=316 g. of glucose.

The mother liquor was again concentrated to 65% and crystallized a second time. The output is 90.5 g. of mixed crystals containing 74%=67 g. of fructose, and $$26\% = 23.5 \text{ g.}$$

of glucose.

Total exploitation is 645.5 g. of mixed crystals containing 306 g. of fructose, and 339.5 g. of glucose.

(b) Production of crystallized fructose and glucose from mixed crystals using methyl glycol as the solvent (1) Glucose crystallization I: 1 kg. dry mixed crystals containing 45.5% fructose and 54.5% glucose was dissolved in 1.5 g. anhydrous methyl glycol during heating on the water bath. The solution was filtered, cooled and after injection with 10 g. anhydrous glucose, stirred for 24 hours at 10° C. Thereafter, mixed crystals were obtained on a centrifuge, washed several times with methanol, and dried in the dry box at 60° C. The ouput is 273 pure white glucose crystals, $[\alpha]_D^{20} = +52.0°$.

(2) Fructose crystallization I: The mother liquor together with the solutions used for washing the glucose crystals of 1, were concentrated on the water bath to 50%, cooled, and injected with 10 g. of fructose crystals. After stirring for 24 hours at 10° C., crystals were recovered as in the preceding paragraph. The yield was 224 g. of fructose crystals, $[\alpha]_D^{20} = -91.6°$.

The crystallization could be continued as in Example 3, until all the sugar in the mother liquor was recovered.

EXAMPLE 6

1000 g. of water-free glucose dissolved in 3.5 l. of water were placed in a 6 l. column containing a return cooler and a stirring device and heated to a boil. A solution of 5 g. of sodium hydroxide in 500 g. of water is added uniformly over 5 minutes while the liquid is maintained at a boil. The heat is then maintained an additional 5 minutes, or until the pH drops below 8.0. Thereafter it is quickly cooled and passed, successively, through a column containing 100 ml. of a cation exchange material (sulfonic acid type, H+ state), 150 ml. of an anion exchange material (weakly basic, dialkylamine type, OH− state), and to obtain a buffering effect, it is filtered through 50 ml. of a cation exchange material (carbonic acid type, H+ state). The resultant solution, as analyzed, contained 130 g. fructose and 825 g. sucrose.

The salt free, colorless sugar solution was condensed in vacuum at a maximum temperature of 90° C. to about 95%. It was then added to 1 kg. boiling methanol with intensive stirring. After injecting water-free glucose with continuous stirring, it was cooled for 6 hours at 10° C., to rapidly produce a sufficient yield of crystals. After 24 hours the crystals were separated by suction from the mother liquor, washed with little methanol and dried at 60° C. in a drying box.

Yield: 789 g. glucose, $[\alpha]_D^{20} = +51.0°$.

The methanolic mother liquor was united with the wash liquid, condensed to about 300 g. and fed at about 2 ml./min. into the evaporating column as indicated in Example 1. The dewatered sugar solution obtained at the foot of the column was again condensed to 300 g., cooled to about 10° C. and crystallized fructose added thereto. After 48 hours of stirring, the crystals were separated from the mother liquor by suction, washed with little methanol and dried at 60° C. in the dry box.

Yield: 67.5 g. fructose, $[\alpha]_D^{20} = -90.3°$.

Then following the procedure of Example 1, two additional crystallization steps were carried out to obtain a total of 103 g. fructose (79.5% of the starting material) and 829 g. glucose (97.2% of the said starting material).

While I have disclosed several embodiments of the present invention it is to be understood that these embodiments are given by example only and not in a limiting sense, the scope of the present invention being determined by the objects and the claims.

I claim:

1. A method for producing fructose and glucose from a mineral acid-free aqueous solution containing fructose and glucose, comprising evaporating water from said solution at a temperature between 50° C. and 120° C., adding methanol or methyl glycol to said solution, and then precepitating glucose and fructose from said solution, and controlling the water content of said solution so that it is not greater than 1% by weight when fructose is precipitated therefrom.

2. The method of claim 1, wherein said solution contains between about 10% and 70% by weight of fructose and between about 90% and 30% glucose.

3. The method of claim 1, wherein the solution containing glucose and fructose is obtained by contacting a sucrose solution with a strongly acidic cationic exchange material.

4. The method of claim 1, wherein an aqueous solution containing glucose is isomerized to obtain said mineral acid-free aqueous solution containing fructose and glucose.

5. The method of claim 4 wherein an aqueous solution containing glucose and fructose is treated with an alkali and then desalted by ion exchange treatments to obtain an aqueous, mineral acid-free and fructose-enriched solution containing glucose.

6. The method of claim 4 wherein the aqueous solution containing glucose also contains fructose and said aqueous solution is treated with enzymes to effect the isomerization.

7. The method of claim 1 wherein said solution containing fructose and glucose is obtained by inverting a sucrose solution containing between about 20% and 75% by weight sucrose by the addition of between about 0.001 and 0.05 equivalent of a mineral acid to a liter of said sucrose solution at a temperature between about 50° C. and 120° C. for a period of time sufficient to invert substantially all of the sucrose in said solution, and wherein said solution is thereafter rapidly cooled and neutralized.

8. The method of claim 7 wherein about 0.01 equivalent of the mineral acid is added to the sucrose solution; wherein said inversion is carried out at a temperature of about 80° C.; and wherein said evaporation is carried out in a vaporizer in which the liquid is vaporized from a thin film at a temperature of less than 120° C.

9. The method of claim 8, wherein said evaporation is carried out by contacting said aqueous invert sugar solution with an anhydrous solvent in the vapor phase moving counter-current to said aqueous solution.

10. The method of claim 8, wherein said glucose and fructose are crystallized sequentially.

11. The method of claim 8 wherein when the crystallization rate has dropped below an economic rate, the precipitated crystals are separated from the mother liquor, and the mother liquor is further inverted, and thereafter glucose and fructose crystallized therefrom.

12. The method of claim 11 wherein the mother liquor is admixed with an invert sugar solution from which glucose and fructose have not yet been crystallized, and then glucose and fructose are precipitated simultaneously from said solution to form a mixture of glucose and fructose crystals, separating said mixture of crystals from the solution leaving a second mother liquor and then inverting said second mother liquor.

13. The method of claim 11 wherein said glucose and fructose are crystallized sequentially.

References Cited

UNITED STATES PATENTS

| | | | |
|---|---|---|---|
| 3,704,168 | 11/1972 | Hara | 127—58 |
| 2,357,838 | 9/1944 | Mahoney | 127—58 |
| 2,354,664 | 8/1944 | Cantor | 127—41 |
| 2,534,694 | 12/1950 | Blann | 127—46 A |
| 3,219,484 | 11/1965 | Smythe | 127—58 X |

MORRIS O. WOLK, Primary Examiner

S. MARANTZ, Assistant Examiner

U.S. Cl. X.R.

127—41, 46A, 58, 61

UNITED STATES PATENT OFFICE
CERTIFICATE OF CORRECTION

Patent No. 3,812,010          Dated May 21, 1974

Inventor(s) Ernst Nitsch

It is certified that error appears in the above-identified patent and that said Letters Patent are hereby corrected as shown below:

In The Heading:

The claimed Priority Data was omitted. Should read:

--March 15, 1967     Austria . . . . . . . A 2512. 1967
--January 31, 1968    Austria . . . . . . . A 950. 1968

Signed and sealed this 1st day of October 1974.

(SEAL)
Attest:

McCOY M. GIBSON JR.
Attesting Officer

C. MARSHALL DANN
Commissioner of Patents